United States Patent
Carr

(10) Patent No.: US 9,552,728 B2
(45) Date of Patent: Jan. 24, 2017

(54) ROUTE-BASED PROPULSION MODE CONTROL FOR MULTIMODAL VEHICLES

(75) Inventor: Daryl L. Carr, Canton, MI (US)

(73) Assignee: General Motors LLC, Detroit, MI (US)

(*) Notice: Subject to any disclaimer, the term of this patent is extended or adjusted under 35 U.S.C. 154(b) by 1607 days.

(21) Appl. No.: 12/782,936

(22) Filed: May 19, 2010

(65) Prior Publication Data

US 2011/0288737 A1    Nov. 24, 2011

(51) Int. Cl.
| | |
|---|---|
| G06F 19/00 | (2011.01) |
| G06G 7/70 | (2006.01) |
| B60T 7/12 | (2006.01) |
| G05D 1/00 | (2006.01) |
| G05D 3/00 | (2006.01) |
| G06F 7/00 | (2006.01) |
| G06F 17/00 | (2006.01) |
| G08G 1/0968 | (2006.01) |
| B60W 30/182 | (2012.01) |
| G01C 21/34 | (2006.01) |

(52) U.S. Cl.
CPC ........ *G08G 1/096833* (2013.01); *B60W 20/11* (2016.01); *B60W 30/182* (2013.01); *G01C 21/3407* (2013.01); *B60W 2550/13* (2013.01); *B60W 2550/143* (2013.01); *B60W 2550/402* (2013.01)

(58) Field of Classification Search
None
See application file for complete search history.

(56) References Cited

U.S. PATENT DOCUMENTS

| | | | |
|---|---|---|---|
| 6,092,021 A | 7/2000 | Ehlbeck et al. | |
| 6,594,579 B1 | 7/2003 | Lowrey et al. | |
| 6,714,857 B2 | 3/2004 | Kapolka et al. | |
| 7,271,716 B2 | 9/2007 | Nou | |
| 7,542,832 B2 | 6/2009 | Nou | |
| 7,561,952 B2 | 7/2009 | Steen | |
| 8,180,506 B2* | 5/2012 | Sacle | G01C 23/005 244/183 |
| 8,428,794 B2* | 4/2013 | Peterson | G08G 5/025 244/76 R |
| 8,712,686 B2* | 4/2014 | Bandyopadhyay | G01C 17/38 701/445 |
| 2003/0036823 A1 | 2/2003 | Mahvi | |
| 2004/0093264 A1 | 5/2004 | Shimizu | |
| 2005/0119798 A1* | 6/2005 | Lee et al. | 701/1 |
| 2005/0125117 A1 | 6/2005 | Breed | |
| 2006/0190148 A1 | 8/2006 | Grenn | |
| 2008/0021628 A1* | 1/2008 | Tryon | B60K 6/46 701/99 |
| 2008/0051977 A1* | 2/2008 | Tryon | 701/103 |
| 2008/0319665 A1 | 12/2008 | Berkobin et al. | |
| 2009/0326748 A1* | 12/2009 | Frese et al. | 701/22 |

\* cited by examiner

*Primary Examiner* — Ariel Yu

(74) *Attorney, Agent, or Firm* — Christopher DeVries; Reising Ethington P.C.

(57) ABSTRACT

A method and system of operating a multimodal vehicle includes determining a vehicle route between a starting point and an ending point, establishing one or more waypoints along the determined vehicle route based on one or more factors such as topography or road classification, and changing the propulsion mode of the vehicle at each of the established waypoints. This can be used, for example, to help optimize the use of different propulsion modes such as gasoline and battery power to thereby increase energy utilization efficiency.

19 Claims, 2 Drawing Sheets

US 9,552,728 B2

ROUTE-BASED PROPULSION MODE CONTROL FOR MULTIMODAL VEHICLES

TECHNICAL FIELD

The present invention relates generally to vehicles and more particularly to vehicles having multimodal propulsion systems.

BACKGROUND OF THE INVENTION

Multimodal vehicles are vehicles that use more than one type of propulsion and/or propulsion energy source for moving the vehicle. These vehicles are becoming increasingly more common on today's roads. Presently, multimodal vehicles include algorithms that control vehicle propulsion systems during everyday driving. However, multimodal vehicles might not be able to adequately anticipate the terrain over which they will travel. And even if present propulsion control systems could anticipate the terrain, the multimodal vehicle may inefficiently allocate usage between the modes of the vehicles.

SUMMARY OF THE INVENTION

According to one embodiment of the invention, there is provided a method of operating a multimodal vehicle as it travels along a vehicle route. The steps include determining a vehicle route between a starting point and an ending point, establishing one or more waypoints along the determined vehicle route based on one or more attributes of the determined vehicle route, and changing a propulsion mode of the vehicle at each of the one or more waypoints. The waypoints may be established based on one or more topographic features of the vehicle route and/or based on one or more other factors, such as type of road, traffic conditions, energy costs, to name just a few.

According to another embodiment of the invention, there is provided another method of operating a multimodal vehicle as it travels along a vehicle route. The steps include determining a vehicle route, identifying at least one topographical feature of the determined vehicle route, and changing a propulsion mode of the vehicle based on the one or more topographical features. In at least some embodiments, the propulsion mode can be changed during driving based on other factors in addition to the topography feature(s).

According to yet another embodiment of the invention, there is provided yet another method of operating a multimodal vehicle as it travels along a vehicle route. The steps include sending a vehicle route request from a vehicle telematics unit to a vehicle call center, generating a vehicle route based on the vehicle route request, identifying the topography of the generated vehicle route, establishing one or more waypoints along the generated route based on the identified topography, sending the generated vehicle route, which includes the one or more waypoints, to the vehicle telematics unit and, when the multimodal vehicle reaches the one or more waypoints, signaling the vehicle propulsion system of the vehicle to change propulsion modes.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENTS

The embodiments described below involve managing the propulsion system of multimodal vehicles in an effort to minimize the operating costs of those vehicles. To do so, a vehicle route can be calculated and then analyzed using an algorithm that considers external factors such as topographic data along that route with respect to the performance characteristics of each vehicle powertrain operating mode. That analysis can result in the generation of waypoints along the vehicle route where the vehicle can change operating modes in order to more efficiently use energy. As the vehicle travels along the vehicle route, the vehicle can determine that it has reached a waypoint and change its propulsion operating mode.

Multimodal vehicles are vehicles that can operate in any of two or more different propulsion modes. This can include vehicles having two or more modes for supplying a single type of energy (e.g., batteries and a gas powered generator) that is used to run a single propulsion system (e.g., electric motors), as well as vehicles that have two or more types of different propulsion systems. These different propulsion operating modes can be supplied using electrical, hydrogen, natural gas, and internal combustion propulsion systems to name a few. These vehicles can include processing capabilities to direct the addition or subtraction of output from each mode of generating propulsion. In that sense, the multimodal vehicle can operate using one mode of generating propulsion and thereafter switch modes to run using another propulsion operating mode. In some types of multimodal vehicles, it is also possible to operate the multimodal vehicle using two or more modes simultaneously. The construction of such vehicle propulsion systems, as well as control programming to switch between propulsion modes is known to those skilled in the art.

Figure 1:
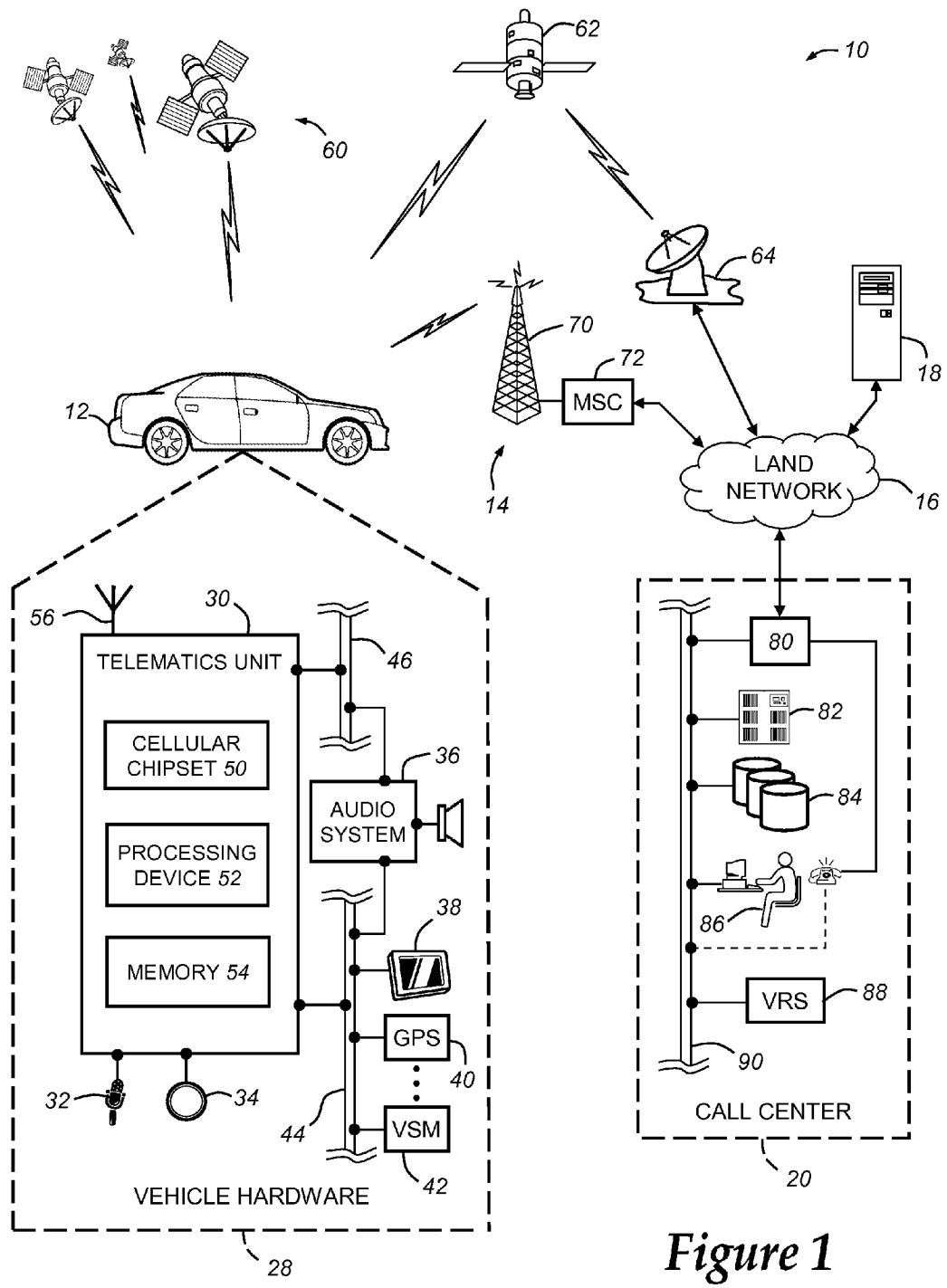
FIG. 1 is a block diagram depicting an exemplary embodiment of a communications system that is capable of using the method disclosed herein.

With reference to FIG. 1, there is shown an exemplary operating environment that comprises a mobile vehicle communications system 10 and that can be used to implement the methods disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is a multimodal vehicle and is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle telematics unit (VTU) 30 is an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via short message service (SMS) or packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to GSM, W-CDMA, or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols used in the wireless industry such as 3gpp or 3gpp2. Wireless networking between the vehicle and other networked devices can also be carried out using telematics unit 30. For this purpose, telematics unit 30 can be configured to communicate wirelessly according to one or more protocols implemented per 3gpp or 3gpp2 standards and also other wireless protocols, such as any of the IEEE 802.11 protocols, WiMAX, or Bluetooth. When used for packet-switched data communication such as TCP/IP, the telematics unit can be configured with a static IP address or can be set up to automatically receive a dynamically assigned IP address from another device on the network, such as from a router or from a network address server (e.g., a DHCP server).

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. For example, the VSMs 42 could provide the fuel level of the vehicle 12 or the charge status of the battery. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as 2G CDMA (IS-95), 3G CDMA2000 (IS-2000, 1XRTT, EVDO), 2G/2.5G GSM (GPRS, EDGE), or 3G W-CDMA (UMTS, HSPA). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, a packet-switched data network (PSDN), and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. For example, computer 18 can be connected to one or more of the other system 10 components via a private or virtual private network (VPN) implemented through a leased line or Internet ISP in the PSDN. Each such computer 18 can be used for one or more purposes, such as a web server accessible by the vehicle via telematics unit 30 and wireless carrier 14. Other such accessible computers 18 can be, for example: a data center where diagnostic information and other vehicle data, such as preferences and/or trip data, can be uploaded from the vehicle via the telematics unit 30; a client computer used by the vehicle owner or other subscriber for such purposes as accessing or receiving trip/vehicle data or to setting up or configuring subscriber preferences or controlling vehicle functions; or a third party repository to or from which trip/vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless local network using protocols such as 802.11x and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
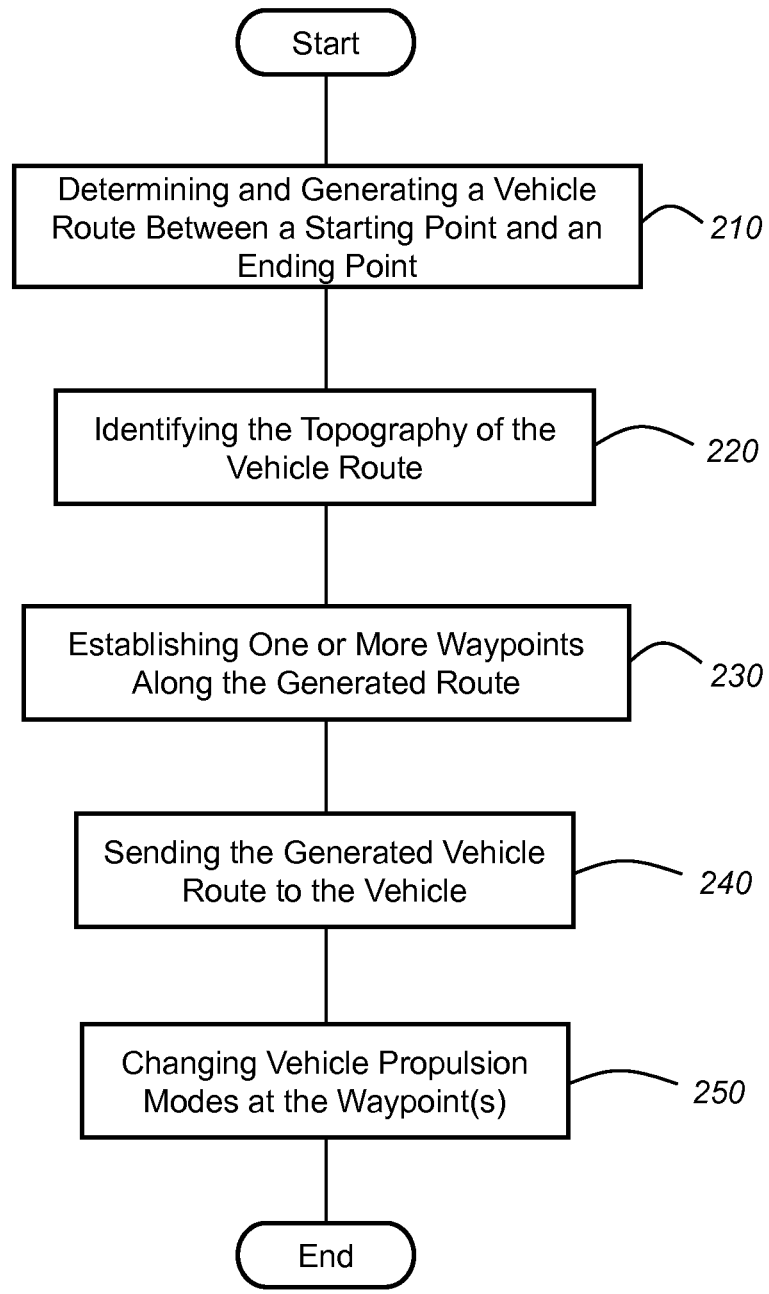
FIG. 2 is a flow chart depicting an exemplary embodiment of a method of route optimization for multimodal vehicles.

Turning now to FIG. 2, there is a method 200 of optimizing a vehicle route for a multimodal vehicle. The method 200 begins at step 210 with determining a vehicle route between a starting point and an ending point. The vehicle route is the road or roads travelled over by the multimodal vehicle between a starting point or present location of the vehicle 12 and its destination location or ending point. Once the starting point/present location and the ending point/destination have been selected, the vehicle route between these points can be determined. This can take place on board the vehicle 12 using one or more buttons 34, the GPS module 40, the processor 52, and/or vehicle memory 54. For example, the vehicle route can be generated by the telematics unit 30 using on-board map data and location information supplied by GPS module 40. In a different embodiment, the route can be generated on-board the vehicle without using telematics unit 30, such as by way of GPS module 40 itself and/or another navigation module that either has its own user interface for inputting and outputting information or that uses the same vehicle user interface used by the telematics unit or some other device in the vehicle. In any case, determining the vehicle route can take into account driver preferences, such as shortest route, fastest route, or the absence of toll roads. The vehicle route can be shown on the display 38 and/or can be audibly output using the audio system 36 of the vehicle 12 as turn-by-turn directions. The vehicle route can be specified by a vehicle occupant who inputs a destination address into the telematics unit 30, whereupon the unit 30 determines the starting point/current location of the vehicle 12 and the destination address using the GPS module 40. The starting point and the ending point can be used by the telematics unit 30 to calculate the turn-by-turn directions the vehicle 12 can follow in order to arrive at its destination. By following these directions, the vehicle 12 can travel over one or more roads in order to reach its destination or ending point. The vehicle route can be defined by a starting point and an ending point. These points can be described as latitude and longitude coordinate pairs that represent a street address, a point of interest, or other specified location, to name a few. The starting and/or ending points can be saved at the vehicle 12 for repeated use or specified by the vehicle occupant prior to or during vehicle operation.

In another embodiment, the vehicle occupant can send a request for the vehicle route having a starting point and an ending point or destination to the call center 20. That request can include the present location of the vehicle 12 and the destination or ending point for the vehicle route. The present location and destination included with the request can be in various forms, such as latitude/longitude coordinates, street addresses, or commonly-recognized points of interest (e.g. Times Square, New York City, N.Y.). It is also envisioned that the starting point and/or ending point can be entered into computing resources at the call center 20 by an advisor. This may occur if a vehicle occupant orally communicates the starting point and/or ending point to the advisor. As one example, the present location of the vehicle can be automatically provided to the call center while the ending point can be spoken by the vehicle occupant. This present location can be assumed as the starting point or that can be affirmatively indicated by the occupant. The call center 20 can then use the starting point/present location of the vehicle 12 and the ending point/destination of the vehicle 12 to calculate a route between those two points. The call center 20 can calculate the route using resources at the call center 20 and/or can communicate with a remotely-located facility (e.g., computer 18) to do so. In addition, the call center 20 can associate the request for the vehicle route with a specific telematics service provider, vehicle, and/or powertrain configuration.

The computer 18 or call center 20 can also consider external data to calculate the vehicle route. Examples of external data include the price of fuel in real time or the availability of fuel in a particular geographical area. For instance, if the call center 20 knew that the vehicle 12 could operate using either compressed natural gas (CNG) or gasoline, the call center 20 could check the price and availability of each fuel along the vehicle route. If the price of CNG was greater than the price of gasoline, the call center 20 could include in the vehicle route an instruction to consume all of the gasoline on board the vehicle 12 before consuming CNG. In another example, the vehicle 12 or the call center 20 can maintain data indicating the age of a vehicle battery. If the range of the battery becomes shorter as it ages, the call center 20 can alter the waypoint position of the vehicle route to compensate for the reduced range. It is also possible for the call center 20 to gather vehicle operating data from the vehicle 12 via the telematics unit 30. This data can be maintained and analyzed to detect trends in vehicle operation or improvements in vehicle routing. The method 200 proceeds to step 220.

At step 220, the topography of the identified vehicle route is identified. The vehicle route often takes the vehicle 12 along roads that can vary. For example, roads may begin on relatively flat land and increase in slope, progressively or sharply. Or in other words, while the vehicle route between its starting point and ending point can appear on a map to be relatively short and direct, that route can rise/fall a significant height. In another example, the roads within the vehicle route can begin as narrow low-speed city streets and change to multi-lane interstates as the route progresses. Given that the vehicle route and the roads that the route includes are known, the underlying characteristics of the land beneath the roads and the characteristics of the roads themselves can be identified.

In one example, one or more topographical features of the land along the vehicle route can be obtained and identified.

Topography data can be accessed at a call center 20 or computer 18 or may ultimately be stored at the vehicle 12. The topography data can include the amount of change in elevation relative to the distance between two points along the vehicle route. In this case, the distance between two points can be measured in a variety of ways, such as the distance between the starting point and the ending point, the distance between any one or more waypoints along the vehicle route, the starting point and a waypoint, or the ending point and a waypoint. The amount of elevation change determined and used in configuring operating modes along the route can be calculated as the difference in elevation between the start and end points or between waypoints, or can be a measure of some or all of elevation changes along the route between two such points (that is, taking into account the continual elevation changes, not just the difference between two points on the route). Topography data could also involve one or more known elevation datum points that coincide with the vehicle route.

The topography of the vehicle route can also include the geography of the vehicle route as well. Geography of the vehicle route can describe a number of attributes. More specifically, geography can refer to the type of road the vehicle 12 will travel along the vehicle route. For instance, the geography of a route can involve an interstate highway or a city street. Ultimately, each possible road type can be assigned a classification. To name a few examples, interstate highways, freeways, and toll roads can be labeled as expressways, whereas city streets, boulevards, and state routes can be labeled as local roads. Other examples are possible. For instance, road classifications can be established based on such metrics as city limit boundaries, population densities, or the zoning of land along the vehicle route. Geographical data can also include fuel prices along the vehicle route and indicate optimal points for refueling the vehicle 12 at a lower cost. Fuel prices could be maintained at the computer 18 or call center 20. Alternatively, the telematics unit 30 could receive the fuel prices from the call center 20 or from the PDA or cell phone of the vehicle occupant via a short-range wireless link. Using the topography and/or geography along the vehicle route, the vehicle 12 can change its mode of propulsion based on this data; these actions will be described later. The method 200 proceeds to step 230.

At step 230, one or more waypoints are established along the generated route. This can be done based on the identified topography and/or on other factors. For topography-based waypoint selection, given that the vehicle route is known, as well as the topography along the vehicle route, that information can be used to locate waypoints along the route at which the operating mode of the vehicle can be changed. In another example, a geographical area can be established using multiple latitude/longitude coordinate pairs and one or more waypoint in that area also can be established. Waypoints can be geographic locations along the vehicle route defined as a particular distance from the starting point. Waypoints can also be geographical points that are defined by a latitude and longitude coordinate pair. Other ways of defining and/or specifying waypoints can be used. The vehicle route can include any number of waypoints depending on the changes in topography. As an example, one or more waypoints can be established along the vehicle route at a point where the rate of change of elevation per distance travelled begins to exceed a threshold.

Waypoint selection can be based on other factors. For instance, waypoints can reflect the operational characteristics of the vehicle 12 with respect to the topography of the vehicle route. Multimodal vehicles can have varying operational characteristics and the waypoints along the vehicle route can be placed to more efficiently use the fuel of a particular vehicle. In one example, a vehicle 12 could use an electric motor/battery combination for propulsion and an internal combustion engine to charge the battery and/or supply power directly to the drive motor(s). The battery in this example may include sufficient capacity to power the vehicle 12 over a range of 45 miles, at which point the vehicle 12 includes a default operating mode instruction that asks the internal combustion engine to switch on and provide power. The range of 45 miles may be extended or reduced based on the waypoint placement. Depending on the topography/geography, waypoints can advance, retard, or halt operation of the internal combustion engine thereby selectively overriding the default operating mode instruction of the vehicle 12. For instance, over a hypothetical vehicle route covering 60 miles, the first 50% of that route could involve climbing a mountain. More battery energy may be used to climb the mountain. As a result, the 45 mile electric/battery range may be modified based on the varying topography. In this case, a waypoint can be established along the route to activate the internal combustion engine earlier than the default propulsion mode instruction calls for, such as at a point 20 miles from the starting point. Starting the internal combustion engine at this point can boost the battery power during more energy-consuming vehicle routes.

In another example, over a hypothetical vehicle route covering 100 miles, the first 50% of that route could involve descending a mountain. In that case, it can be possible to charge the battery of the vehicle 12 using known regenerative braking techniques while descending the mountain. As a result, a waypoint can be placed 45 miles from the starting point of the vehicle route and when the vehicle 12 reaches that point, instead of starting the internal combustion engine as would be called for by the default propulsion mode, the vehicle 12 can generate an instruction that maintains electric motor/battery operation and retards the start of the internal combustion engine operation. This can extend the 45 mile vehicle range. And in addition, another waypoint can be established somewhere between 45 miles from the starting point and the ending point. This waypoint can be established based on the amount of battery charging the regenerative braking accomplished and the topography/geography of the remaining vehicle route. At that waypoint, the vehicle 12 can switch propulsion operating modes from purely electric motor/battery to receiving energy from the internal combustion engine.

Non-topographic attributes of the vehicle route can be used in addition to or in lieu of the topography. For example, road classifications can be used, such as expressway versus local road, two-lane versus three or four lane roads, road location (urban versus suburban versus rural), paved versus unpaved. Other factors can be used including energy refueling availability and/or cost for one propulsion mode versus another, etc. As one specific example, consider a hypothetical vehicle route that covers 55 miles and 90% of that route could include local roads while the remainder included expressway. It may be possible that the vehicle 12 operates more efficiently travelling the local roads in relation to expressways and a waypoint can be established along the vehicle route modifying the place along the vehicle route at which the vehicle 12 switches propulsion modes. Instead of solely using the electric motor/battery for 45 miles and operating the internal combustion engine for the last 10 miles, a waypoint can be placed along the route 45 miles from the starting point. There, the vehicle 12 may normally begin operating the internal combustion engine as called on by the default operating mode. However, given that the vehicle route may be more efficient than the vehicle 12 normally anticipated the vehicle may be able to travel the entire vehicle route without engaging the internal combustion engine. This may be especially true in the event the route is a return route to a home location or other place where it is known that recharging energy is available for the batteries. Such factors can be taken into account when determining what propulsion mode to use where during the route. As a result, the waypoint can include an instruction that interrupts the default instruction of the vehicle 12 (e.g. starting the internal combustion engine) allowing the vehicle 12 to travel the vehicle route using the electric motor/battery combination alone. In this way, vehicle propulsion can be at least partially optimized so as to provide the vehicle owner the lowest energy use cost per mile. The method 200 proceeds to step 240.

At step 240, the generated vehicle route, which includes the one or more waypoints, is sent to the vehicle telematics unit. In some embodiments, steps 210-230 can be carried out at the call center 20 or in a back office facility, such as computer 18. If so, the vehicle route, along with the waypoints and any other machine instruction(s), can be sent to the vehicle 12 via the wireless communication system 14 and received at the telematics unit 30. There, the telematics unit 30 can leverage vehicle hardware and software to provide the vehicle route to the vehicle occupant and carry out machine instructions, such as operational/propulsion mode changes at the waypoints. Vehicle hardware examples include audio system 36, display 38, GPS module 40, or processor 50, to name a few. In other embodiments, steps 210-230—or some fraction of those steps—are carried out at the vehicle 12 without requesting or receiving the vehicle route from the call center 20. In those embodiments, the vehicle 12 carries sufficient computing resources to store the topographical data and generate the vehicle route at the vehicle 12. The method 200 proceeds to step 250.

At step 250, the vehicle propulsion system of the vehicle is signaled to change operating modes when the vehicle reaches one or more waypoints. Once the vehicle route is determined and one or more waypoints have been generated, the vehicle 12 can use GPS module 40 to detect that a waypoint has been reached and execute some function, such as changing the propulsion mode of the vehicle 12 or preventing a previously-determined change from occurring, as has been previously described. For instance, the vehicle 12 can use the telematics unit 30 to determine when it is within a predetermined range from a waypoint, such as 500 feet. At that time, the telematics unit 30 can execute a function based on the waypoint. In this case, the telematics unit 30 can send an instruction over the vehicle bus 44 to the powertrain control module (which is one of the VSMs 42) when it is within the predetermined range of the waypoint. That instruction can involve changing from one propulsion mode to another, or can involve preventing a propulsion mode change. However, the engine control module of the vehicle 12 or input from the driver could be able to override the mode change if needed. For example, if the vehicle 12 were climbing a steep grade and operating the internal combustion engine to assist the battery for later in the route, it is possible that flooring the accelerator (to support passing on a steep grade) could force the vehicle 12 to override all other instructions and use the battery to assist with acceleration. The vehicle would begin following the instructions of the vehicle route when the conditions returned to normal. It should also be appreciated that if the vehicle 12 deviates from the determined vehicle route, the vehicle 12 can sense this and return to the default operating mode. In another embodiment, the vehicle 12 can gather data that represents the performance of the vehicle 12 as a result of the operating mode change(s). For instance, the vehicle 12 can collect data indicating vehicle fuel consumption before, during, or after changing operating modes at the determined waypoints. Then, that data can be analyzed and the method 200 of optimizing the vehicle route can be improved based on the data. The collected data can be stored and processed at the vehicle to improve the waypoint and propulsion mode change, or can be sent wirelessly to the call center where it can be processed and used there for subsequent waypoint determinations or used to generate updated software and/or data used at the vehicle when determining the waypoint(s). The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, in some embodiments, rather than determining a route in advance, the vehicle could detect the location and/or route in real time (e.g., by monitoring the current vehicle location as it moves) and, using information such as map data, general or specific topographical features of the road or of the general area of the vehicle, and/or other internal (at the vehicle) or external data, could determine in real time what propulsion mode should be used. This can be done at the vehicle or at a remote facility. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of operating a multimodal vehicle as it travels along a route, comprising the steps of:
   (a) determining at a remote facility using external data a vehicle route between a starting point and an ending point, wherein the external data is interpreted by a computer and used by that computer to create the vehicle route in the form of data capable of being wirelessly transmitted to the vehicle;
   (b) establishing at the remote facility one or more waypoints along the determined vehicle route based on the external data and embedding the waypoints as part of the vehicle route using the computer;
   (c) including along with the determined vehicle route an instruction executable by a processor on the vehicle to change a propulsion mode of the vehicle at each of the one or more waypoints; and (d) wirelessly sending the determined vehicle route and the instruction from the remote facility to the vehicle.

2. The method of claim 1, wherein at least one of the starting point and ending point further comprises one or more of: a latitude and longitude coordinate pair, a street address, or a point of interest.

3. The method of claim 1, wherein step (b) further comprises establishing the one or more waypoints at least partially on a non-topographical attribute of the vehicle route.

4. The method of claim 1, wherein step (b) further comprises identifying the topography of the vehicle route and establishing the one or more waypoints based on the identified topography.

5. The method of claim 4, wherein the topography of the vehicle route further comprises the amount of change in elevation relative to the distance between two points along the vehicle route.

6. The method of claim 4, wherein step (b) further comprises establishing a waypoint along the vehicle route when the rate of change in elevation per distance travelled exceeds a threshold.

7. The method of claim 1, wherein step (c) further comprises the step of overriding a default propulsion mode instruction of the vehicle.

8. The method of claim 1, wherein step (c) further comprises the step of advancing or retarding a default propulsion mode instruction of the vehicle.

9. A method of operating a multimodal vehicle as it travels along a route, comprising the steps of:
  (a) receiving a computer-readable request from a vehicle telematics unit for a vehicle route at a remotely-located facility;
  (b) associating the computer-readable request at the remotely-located facility with a telematics service provider, a vehicle, or a powertrain configuration, wherein the association is accomplished using computing resources located at the remotely-located facility or computing resources accessible by the remotely-located facility;
  (c) creating a vehicle route using the computing resources based on the association of step (b);
  (d) identifying at least one topographical feature of the determined vehicle route using the computing resources; and
  (e) including a computer-readable instruction in the vehicle route to change a propulsion mode of the vehicle based on the one or more topographical features.

10. The method of claim 9, wherein step (c) further comprises creating the vehicle route using starting and ending points provided by a vehicle occupant.

11. The method of claim 9, wherein step (c) comprises creating the vehicle route in real time based on vehicle movement.

12. The method of claim 9, further comprising the step of establishing one or more waypoints along the created vehicle route based on the topography of the vehicle route; and wherein step (e) further comprises changing the propulsion mode at one or more of the waypoints.

13. The method of claim 9, wherein step (e) further comprises the step of overriding a default propulsion mode instruction of the vehicle.

14. The method of claim 9, wherein step (e) further comprises the step of advancing or retarding a default propulsion mode instruction of the vehicle.

15. A method of operating a multimodal vehicle as it travels along a route, comprising the steps of:
  (a) sending a vehicle route request from a vehicle telematics unit to a vehicle call center, wherein the vehicle route request is created using a processor carried by the vehicle;
  (b) generating a vehicle route based on the vehicle route request using computing resources located at a remotely-located facility or computing resources accessible by the remotely-located facility;
  (c) identifying the topography of the generated vehicle route using the computing resources;
  (d) establishing one or more waypoints along the generated route by including one or more computer-readable instructions in the vehicle route based on the identified topography;
  (e) sending the generated vehicle route, which includes the one or more waypoints, to the vehicle telematics unit; and
  (f) when the vehicle reaches the one or more waypoints, signaling the vehicle propulsion system of the vehicle to change operating modes based on the computer-readable instructions; and
  (g) changing an operational mode of the vehicle propulsion system independent of the one or more waypoints when the rate of change in elevation per distance travelled exceeds a threshold as detected by vehicle electronics.

16. The method of claim 15, wherein the vehicle route further comprises a starting point and an ending point.

17. The method of claim 16, wherein the starting point or ending point further comprises one or more of: a latitude and longitude coordinate pair, a street address, or a point of interest.

18. The method of claim 15, wherein step (f) further comprises the step of overriding a default propulsion mode instruction of the vehicle.

19. The method of claim 15, wherein step (f) further comprises the step of advancing or retarding a default propulsion mode instruction of the vehicle.

* * * * *